(12) United States Patent
Chang et al.

(10) Patent No.: US 7,599,032 B2
(45) Date of Patent: Oct. 6, 2009

(54) LIQUID CRYSTAL DISPLAY DEVICE HAVING COMMON ELECTRODES WITH REDUCED RESISTANCE

(75) Inventors: Sung-Soo Chang, Seoul (KR); Woo-Hyun Kim, Seoul (KR); In-Seob Kim, Kycongsangbuk-Do (KR); Dong-Hoon Lee, Kyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 406 days.

(21) Appl. No.: 11/303,993

(22) Filed: Dec. 19, 2005

(65) Prior Publication Data

US 2007/0002246 A1    Jan. 4, 2007

(30) Foreign Application Priority Data

Jun. 30, 2005    (KR) ...................... 10-2005-0058901

(51) Int. Cl.
    *G02F 1/1343*    (2006.01)
(52) U.S. Cl. .......................... 349/141; 349/139; 349/147
(58) Field of Classification Search ................. 349/139, 349/141, 142, 147
    See application file for complete search history.

(56) References Cited

U.S. PATENT DOCUMENTS 6,774,965 B2 *  8/2004  Nakashima et al. ......... 349/114
2001/0007779 A1 *  7/2001  Lee et al. ....................... 438/30
2001/0052949 A1 *  12/2001  Yamaguchi et al. ........... 349/39
2005/0030461 A1 *  2/2005  Ono et al. .................... 349/141
2005/0105032 A1 *  5/2005  Ono et al. .................... 349/139

* cited by examiner

*Primary Examiner*—Andrew Schechter
*Assistant Examiner*—Lauren Nguyen
(74) *Attorney, Agent, or Firm*—Morgan Lewis & Bockius LLP

(57) ABSTRACT

A liquid crystal display (LCD) device includes a unit pixel defined by a gate line formed on a substrate and a data line crossing the gate line, a switching device formed in the unit pixel, a common electrode line formed parallel to the gate line, the common electrode line including a first transparent electrode layer and a first conductive layer, a common electrode having a conductive portion and a light transmitting portion formed within the unit pixel and connected to the common electrode line, the conductive portion formed along a periphery of the common electrode including a second transparent electrode layer and a second conductive layer, and the light transmitting portion including a third transparent electrode layer disposed in a middle portion of the common electrode includes a third transparent electrode layer, and a pixel electrode having a slit region arranged to face the common electrode.

7 Claims, 8 Drawing Sheets

LIQUID CRYSTAL DISPLAY DEVICE HAVING COMMON ELECTRODES WITH REDUCED RESISTANCE

This application claims the benefit of the Korean Patent Application No. 2005-0058901 filed in Korea on Jun. 30, 2005, which is hereby incorporated by reference.

BACKGROUND OF THE INVENTION

1. Field of the Invention

The present invention relates to a liquid crystal display device, and more particularly, to a structure of a fringe field switching mode (FFS mode) liquid crystal display device and a method for fabricating the same.

2. Discussion of the Related Art

As society has become increasingly technocentric, demands for various types of display devices have been on the rise. Research has been actively ongoing with respect to flat panel display devices, such as LCDs (liquid crystal displays), PDPs (plasma display panels), ELDs (electro luminescent displays), FEDs (field emission displays), VFDs (vacuum fluorescent displays), as well as other emerging display technologies. Of the aforementioned flat panel display devices, LCDs have received much attention because they are simple to mass produce, light and thin, and can easily be coupled to driving systems that produce high picture quality while consuming small amounts of power.

An LCD device is generally a transmissive display device. More particularly, an LCD device displays a desired image by controlling, pixel by pixel, the amount of light transmitted through a pixel. Pixel control is achieved by individually supplying data signals according to image information to the pixels arranged in a matrix configuration. Such an LCD device is commonly driven by an active matrix (AM) method. In the active matrix method, a switching device such as a thin film transistor (TFT) is added to each pixel. A voltage is applied to liquid crystal molecules of the pixel region through the switching device to drive the liquid crystal molecules in each pixel region.

The LCD device may be classified into various display modes according to the driving characteristics of the liquid crystal molecules. Of the several display modes, a TN (twisted nematic) mode LCD device has generally been used. The TN mode LCD device drives liquid crystal molecules such that an electric field perpendicular to the substrate is turned ON/OFF. Accordingly, orientation of the liquid crystal molecules is at an angle of 0~90° to a substrate.

Because the liquid crystal molecules in a TN mode LCD device is driven perpendicularly to the substrate, viewing angle characteristics of such a device is not very good. Namely, an angle at which the display can be viewed is limited because color and brightness of an image from a screen varies depending on the direction or angle that a viewer observes the LCD device. To overcome such a disadvantage, a new viewing angle technology, namely, an in-plane switching (IPS) mode LCD device has been proposed.

The IPS mode LCD device generates an in-plane electric field that drives the orientation of the liquid crystal molecules parallel to the substrate along the direction of the in-plane electric field. More particularly, when a voltage is applied to an electrode in an IPS mode LCD device, an in-plane electric field is generated on the substrate and aligns the liquid crystal molecules horizontally, thereby increasing the viewing angle as compared to that of the TN mode LCD device.

FIG. 1 is a schematic plan view illustrating a structure of a unit pixel of an IPS mode LCD device according to a related art. As shown, a unit pixel is defined by a gate line 1 and a data line 3, which are formed of a metallic layer and arranged horizontally and vertically, respectively, on a first substrate of the LCD device. Specifically, an LCD device has (n×m) pixels corresponding to the intersection of n-number of gate lines and m-number of data lines. For purposes of simplifying the explanation of the related art, FIG. 1 shows only one pixel among the (n×m) number of pixels.

At the intersection of the gate line 1 and the data line 3, a switching device, such as a thin film transistor (T) including a gate electrode 1g, a semiconductor layer (not shown), and source/drain electrodes 3a and 3b, is formed. The gate electrode 1g and the source electrode 3a are connected to the gate line 1 and the data line 3, respectively, such that the switching device (T) is turned ON with a signal inputted through the gate line 1 to transmit an image signal supplied through the data line 3 to the unit pixel.

A common electrode line 11 transmitting a common signal is arranged parallel to the gate line 1 within the unit pixel. At least one pair of electrodes driving the liquid crystal molecules, namely, a common electrode 13 and a pixel electrode 15, are arranged in parallel to the data line 3, thereby generating an in-plane electric field parallel to the substrate. Here, the common electrode line 11 and the common electrode 13 are formed simultaneously by extending the common electrode 13 perpendicularly from the common electrode line 11.

The pixel electrode 15 is formed on a passivation layer (not shown) covering an entire substrate. The pixel electrode is arranged near the source/drain electrodes 3a and 3b and is connected to the drain electrode 3b through a contact hole 7. Additionally, a storage capacitor is formed by a storage electrode 11' extending from the drain electrode 3b and overlapping the common electrode line 11 with an interposing gate insulation layer (not shown) formed therebetween.

On a second substrate (not shown) facing the first substrate, a black matrix for preventing leakage of unnecessary light, a color filter for generating color, and an overcoat layer for flattening are formed. Also, an alignment layer (not shown) for determining an initial direction of alignment for the liquid crystals are is formed on facing surfaces of the first and second substrates. A liquid crystal layer is formed in a gap between the first substrate and the second substrate.

In the IPS mode LCD device having the above-described structure, an in-plane electric field is generated on the substrate because the common electrode 13 and the pixel electrode 15 are all disposed on the same substrate. Accordingly, the liquid crystal molecules in the liquid crystal layer are driven along the in-plane electric field parallel direction to the substrate, namely, the orientation of the liquid crystal molecules is parallel to the substrate. Hence, an image displayed on the front surface of the LCD device can be viewed from any directions, such as from the right, left, lower, and upper sides, thereby fundamentally improving the characteristics of the viewing angle.

One of the disadvantages in the related art IPS mode LCD device is that an aperture area of the LCD device is decreased and the transmittance of light is degraded. The common electrode 13 and the pixel electrode 15 are generally opaque metallic layers disposed in the pixel region where an image is displayed, thereby decreasing the quality of the image. Furthermore, because of the generally opaque nature of the common electrode 13 and the pixel electrode 15, a stronger backlight is needed to provide proper brightness, thereby increasing power consumption. In order to solve the aforementioned problems, using transparent material for the electrode pair has been proposed. However, this solution only slightly improves the aperture ratio, and there is no significant effect on improving light transmittance characteristics of the display.

SUMMARY OF THE INVENTION

Accordingly, the present invention is directed to an LCD device having common electrodes with reduced resistance that substantially obviates one or more problems due to limitations and disadvantages of the related art.

An object of the present invention is to provide an LCD device and a fabrication method of the same with increased aperture ratio.

Another object of the present invention is to provide an LCD device and a fabrication method of the same with reduced resistance when the aperture ratio is increased.

Yet another object of the present invention is to provide an LCD device and a fabrication method of the same with reduced interference between a data line and a common electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes a unit pixel defined by a gate line formed on a substrate and a data line crossing the gate line, a switching device formed in the unit pixel, a common electrode line formed parallel to the gate line, the common electrode line including a first transparent electrode layer and a first conductive layer, a common electrode having a conductive portion and a light transmitting portion formed within the unit pixel and connected to the common electrode line, the conductive portion formed along a periphery of the common electrode including a second transparent electrode layer and a second conductive layer, and the light transmitting portion including a third transparent electrode layer disposed in a middle portion of the common electrode includes a third transparent electrode layer, and a pixel electrode having a slit region arranged to face the common electrode.

In another aspect, a method for fabricating a liquid crystal display (LCD) device includes forming a gate line, a common electrode line, and a common electrode on a substrate, the common electrode line being parallel to the gate line and including a transparent electrode layer and a conductive layer, the common electrode being connected to the common electrode line and including the transparent electrode layer and the conductive layer, forming a gate insulation layer covering the gate line, common electrode line, and the common electrode, forming an active layer on the gate insulation layer, forming a data line, a source electrode, and a drain electrode, the source and drain electrodes being formed on the active layer, forming a passivation layer, and forming a pixel electrode on the passivation layer and connected to the drain electrode through a contact hole, the pixel electrode including a slit region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

It will be apparent to those skilled in the art that various modifications and variations can be made in the LCD device of the present invention and the method of fabricating the same without departing from the spirit or scope of the invention. Thus, it is intended that the present invention cover the modifications and variations of this invention provided they come within the scope of the appended claims and their equivalents.

DETAILED DESCRIPTION OF THE PREFERRED EMBODIMENTS

Reference will now be made in detail to the preferred embodiments of the present invention, examples of which are illustrated in the accompanying drawings.

Figure 1:
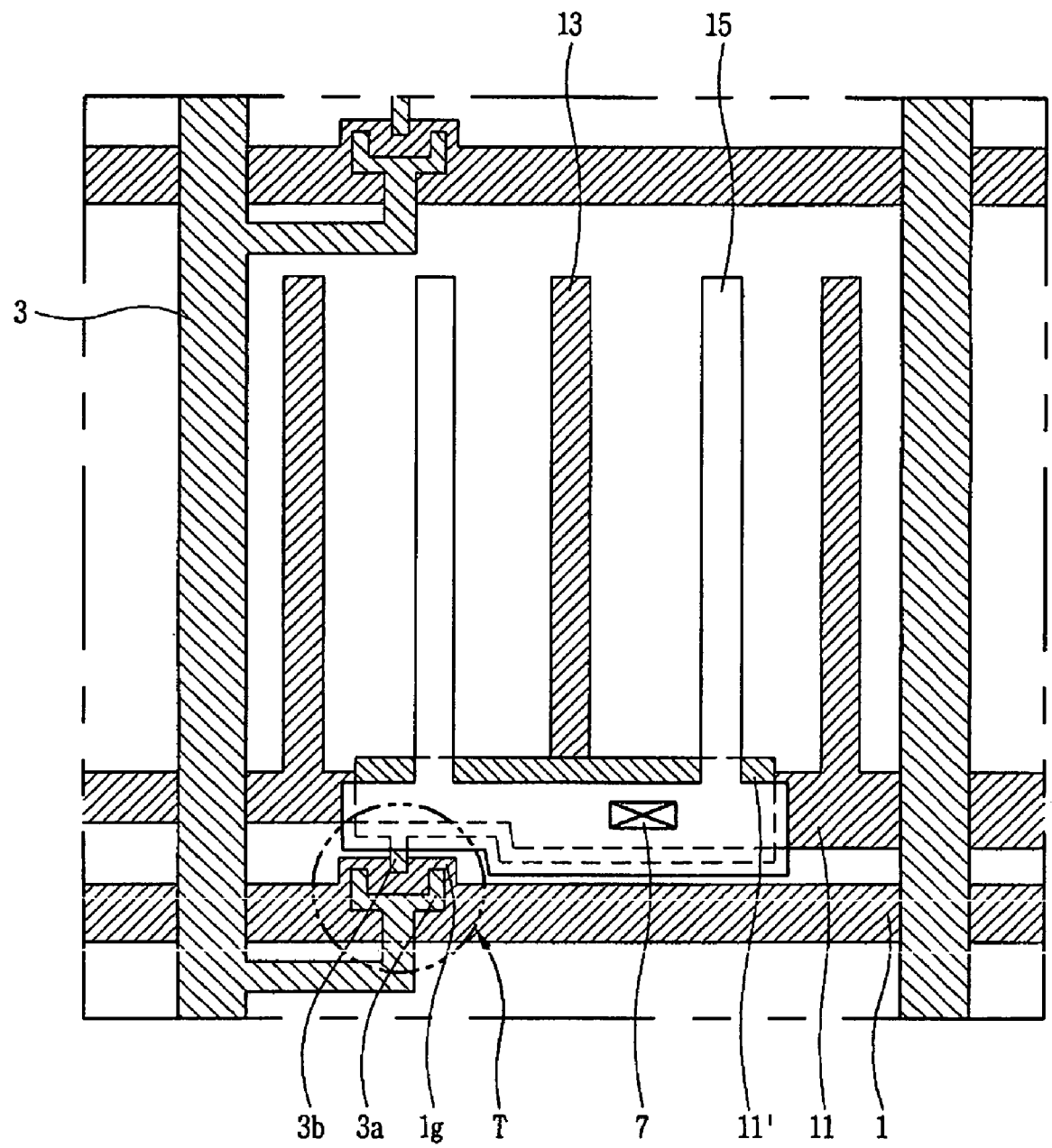
FIG. 1 is a plan view illustrating a unit pixel of an IPS mode LCD device according to the related art.
Figure 2:
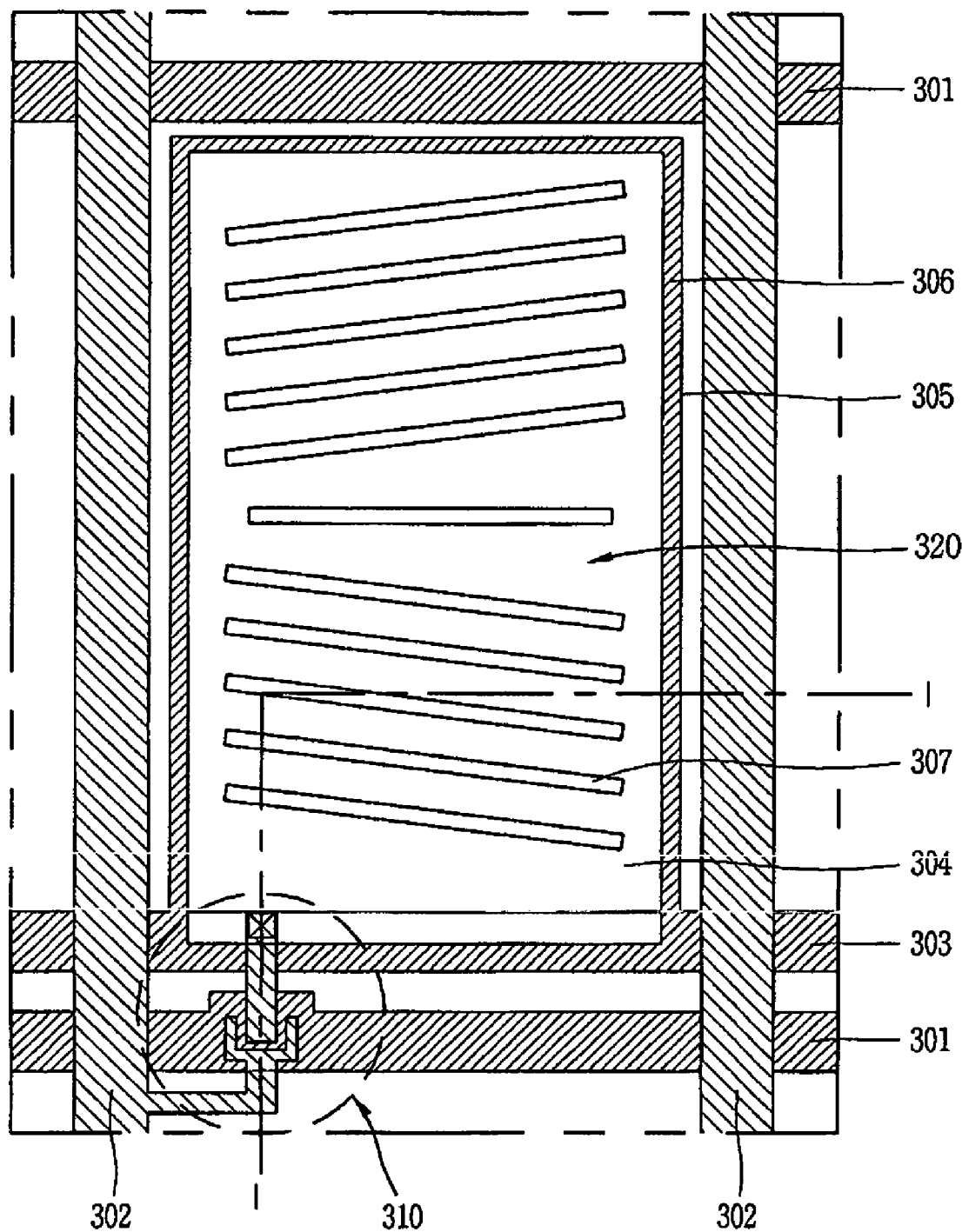
FIG. 2 is a plan view that illustrates a unit pixel of an LCD device in accordance with a first exemplary embodiment of the present invention.
Figure 3:
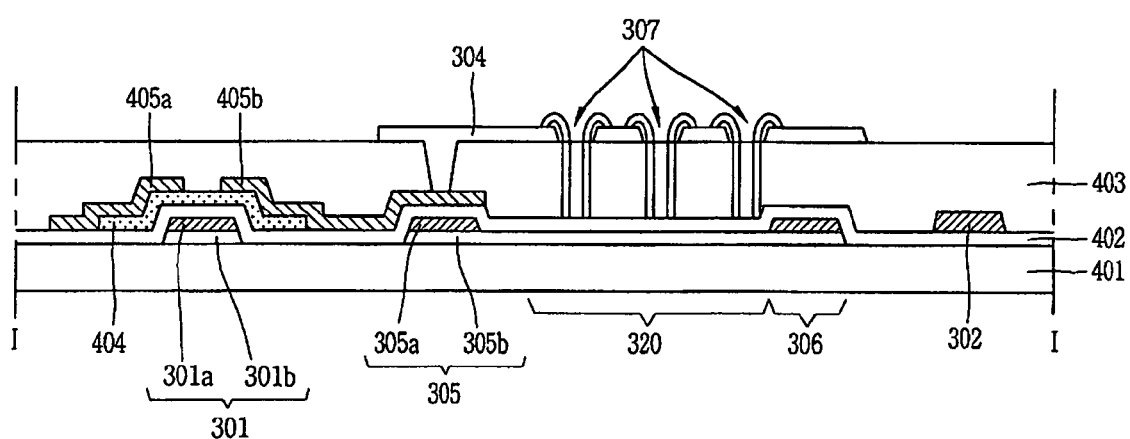
FIG. 3 is a sectional view taken along line I-I of FIG. 2.

An exemplary structure of an LCD device in accordance with a first exemplary embodiment of the present invention is described with reference to FIGS. 2 and 3. In particular, FIG. 2 is a plan view of an exemplary unit pixel in accordance with the present invention. FIG. 3 is a sectional view taken along line I-I of FIG. 2.

FIG. 2 shows one unit pixel for the purpose of simplicity in describing an exemplary embodiment of the present invention. An LCD device in accordance with the present invention includes a plurality of gate lines 301 and a plurality of data lines 302 formed on a substrate. The data line 302 crosses the gate lines 301 at a right angle and defines a unit pixel. A common electrode line 303 parallel to the gate line 301 and applying a voltage to a common electrode is formed on the same layer as the gate line 301. In the first exemplary embodiment of the present invention, the gate line 301 and the common electrode line 303 are made of multiple layers by stacking a transparent electrode material and a conductive material on a bare glass substrate. Also, a thin film transistor 310 for switching a unit pixel is formed at the unit pixel.

A common electrode 305 is formed at the unit pixel and electrically connected to the common electrode line 303. The common electrode 305 includes a light transmitting portion 320 transmitting light and a conductive portion 306 encompassing an edge of the light transmitting portion. The light transmitting portion 320 is formed of a transparent conductive material such as indium-tin-oxide (ITO). The conductive portion 306 is formed such that the transparent conductive material and a conductive material having good conductivity, such as a metal layer, are stacked to form a bank. The common electrode 305 is formed by sequentially stacking a first electrode layer, which is the transparent electrode material, and a second electrode layer, which is the conductive material having good conductivity, and then removing the second electrode layer from the light transmitting portion 320. To reduce the fabrication process, the gate line 301 may also be formed during the same process of forming the common electrode 305 by stacking the first electrode layer and the second electrode layer to form the gate line 301.

A pixel electrode 304 facing the common electrode 305 and forming an in plane electric field is formed at the unit pixel. The pixel electrode 304 is formed of a transparent electrode material and includes at least one slit portion 307 formed by, for example, cutting and removing a portion of the transparent electrode material. Through the slit portion 307, an in-plane electric field having a parabola shape is formed between the common electrode 305 and the pixel electrode 304.

Because the common electrode and the pixel electrode are transparent, an aperture ratio is improved. Light transmittance is further improved by the slit portions formed upon removing the transparent electrode material. In addition, as an in-plane electric field having a parabola shape is formed through the slit portions, liquid crystals in a direction parallel to the substrate is easily facilitated.

The conductive portion 306 formed at an edge of the common electrode 305 is formed of a conductive material such as metal or the like. The conductive material is connected to the common electrode line 303. Because transparent electrode materials such as ITO generally have lower electrical conductivity than conductive materials, transmission of image information may be delayed if only the transparent electrode material is used, thus degrading picture quality. Therefore, in order to smoothly supply a common voltage to a unit pixel, an upper conductive layer of the common electrode line 303 and the conductive portion 306 of the common electrode 305 are electrically connected to reduce resistance and smoothly provide a common voltage to the unit pixel. Furthermore, the conductive portion 306 overlaps the pixel electrode 304, thereby increasing the capacity of the storage capacitor.

A sectional structure of the LCD device in accordance with the first exemplary embodiment of the present invention will now be described with reference to FIG. 3. As shown in FIG. 3, a gate line 301 and a common electrode 305 are formed on a substrate 401, such as bare glass. The gate line 301 is formed by stacking a conductive material 301a and a transparent electrode material 301b. The common electrode 305 includes a light transmitting portion 320 transmitting light and a conductive portion 306 formed along an edge of the light transmitting portion 320. The light transmitting portion 320 is formed of a transparent electrode material 305b, and the conductive portion 306 includes a transparent electrode material 305b and a conductive line 305a formed of a conductive material. The conductive line 305a is formed of the same material as an upper conductive material of the common electrode line 303.

A gate insulation layer 402 covering the gate line 301 and the common electrode 305 is formed. An active layer 404 is further formed on the gate insulation layer, and source and drain electrodes 405a and 405b connected to the active layer 404 are formed on the active layer 404. When the source and drain electrodes 405a and 405b are formed, a data line 302 providing data signals to the source electrode 405a is formed at the same time. Furthermore, the source and drain electrodes 405a and 405b are protected by a passivation layer 403. Thereafter, a pixel electrode 304 is formed on the passivation layer 403 and connected to the drain electrode 405b. The pixel electrode 304 includes a plurality of slit portions 307. When voltage is applied, an in-plane electric field having a parabola shape is formed through the slit portions 307.

Figure 4:
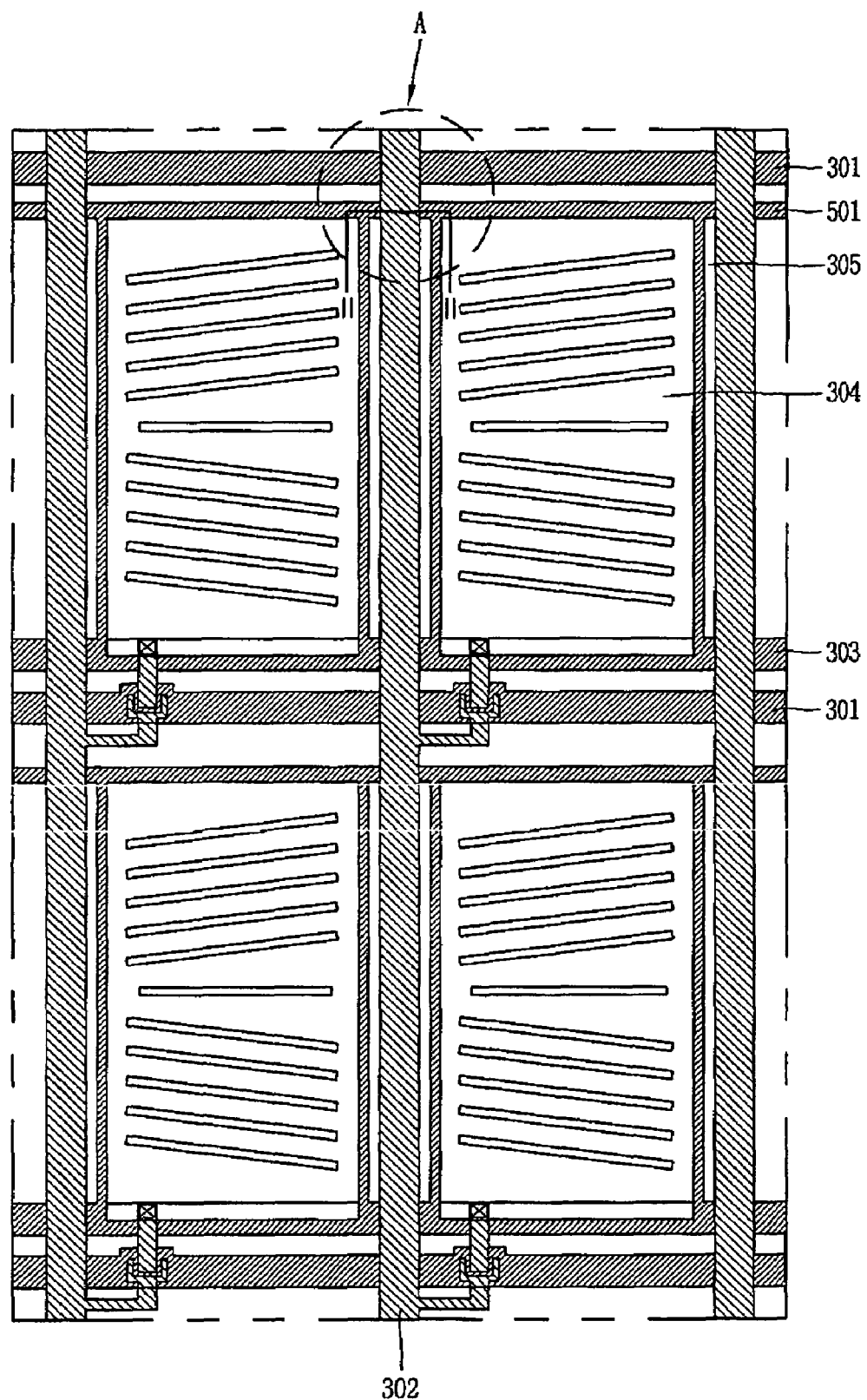
FIG. 4 is a plan view of a unit pixel that illustrates a second exemplary embodiment of the present invention.
Figure 5:
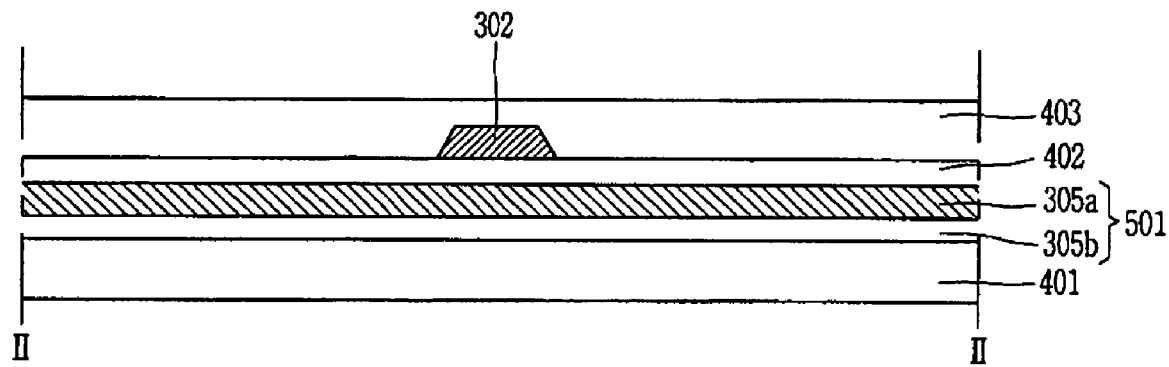
FIG. 5 is a sectional view taken along line II-II of FIG. 4.

In the first exemplary embodiment of the present invention, the conductive line 305a connected to the common electrode line 303 is formed at the edge of the common electrode 305 formed in the unit pixel to reducing resistance. FIGS. 4 and 5 show a second exemplary embodiment of the present invention. In the second exemplary embodiment, to better reduce resistance of the common electrode 305, a connection line 501 electrically connecting neighboring common electrodes with each other in the gate line direction is further provided. FIG. 4 is a plan view of the second exemplary embodiment, and FIG. 5 is a sectional view of region A taken along line II-II of FIG. 4.

Reference numeral 501 of FIG. 4 indicates a connection line, and the connection line 501 connects common electrodes 305 of neighboring unit pixels with each other in the direction of the gate line. The connection line 501 is formed in each unit pixel and may be formed simultaneously in the step of forming the gate line 301 and the common electrode line 303. The connection line 501 may be formed by stacking a transparent electrode material constituting a transparent electrode layer 305a of the common electrode 305 and a conductive material constituting a conductive line 305a of the common electrode 305. The rest of the structure is the same as that of the first exemplary embodiment.

Figure 6:
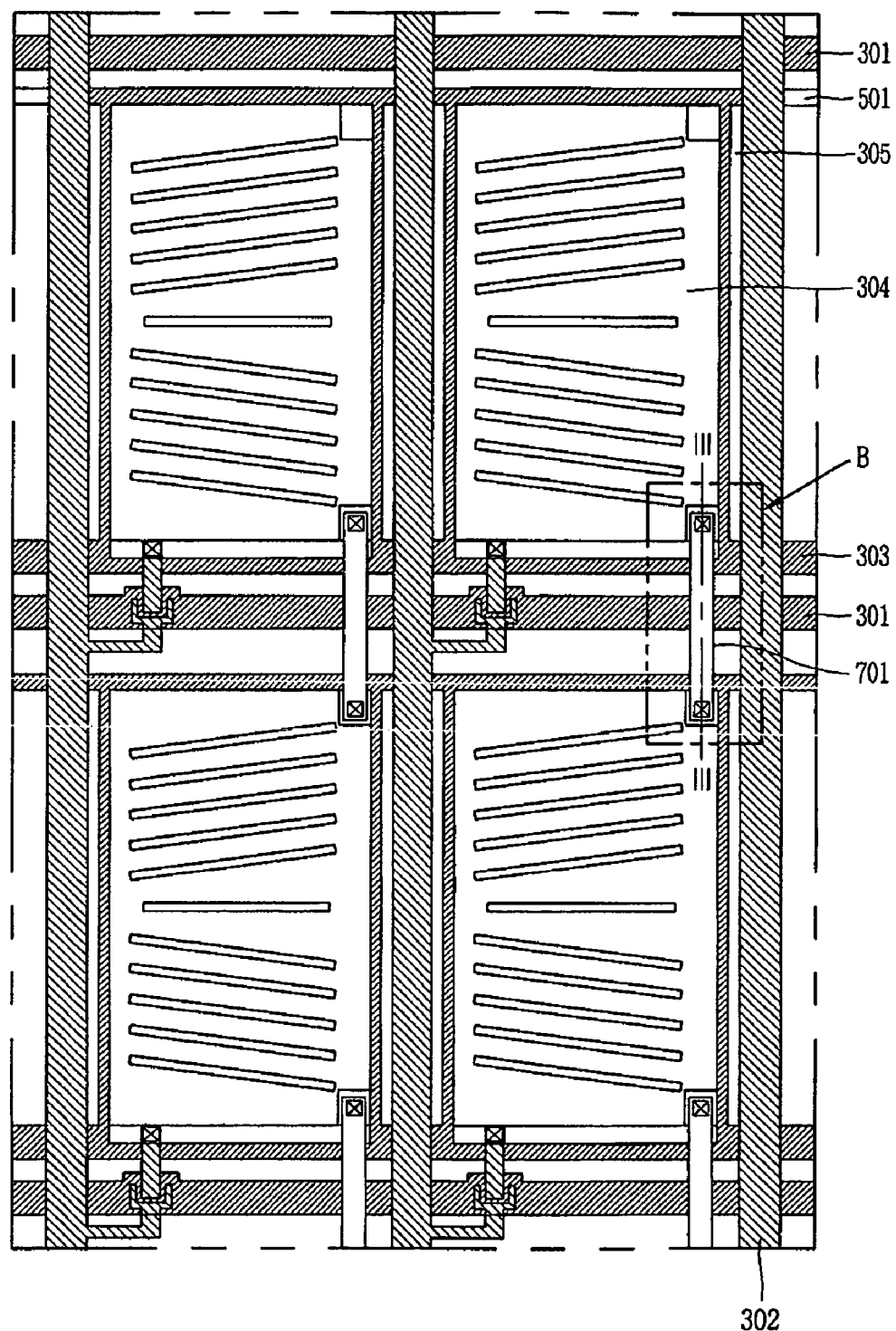
FIG. 6 is a plan view of a unit pixel that illustrates a third exemplary embodiment of the present invention.
Figure 7:
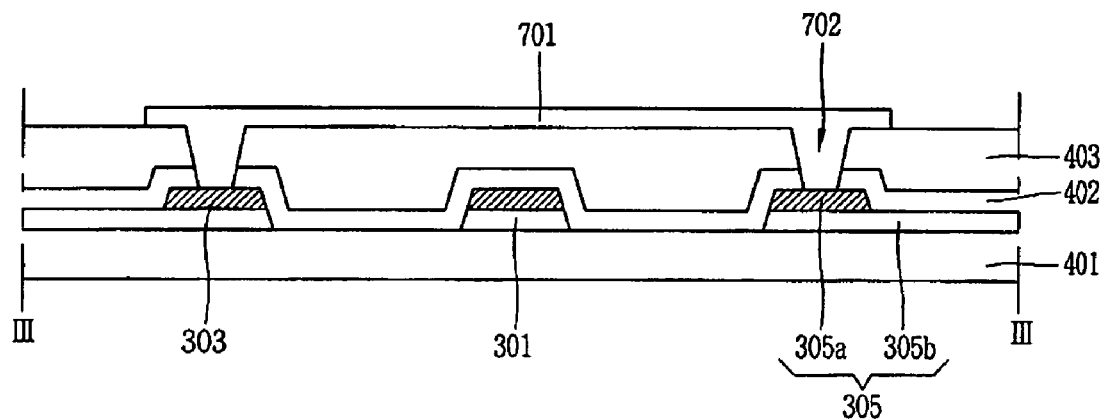
FIG. 7 is a sectional view taken along line III-III of FIG. 6.

A third exemplary embodiment of the present invention for further reducing resistance of the common electrode 305 will now be described with reference to FIGS. 6 and 7. FIG. 6 is a plan view of the third embodiment of the present invention, and FIG. 7 is a sectional view of region B taken along line III-III of FIG. 6.

The third exemplary embodiment illustrated in FIG. 6 is characterized in that a conductive path connecting neighboring pixel electrodes 304 with each other in a direction of the data line 302. Referring to FIG. 7, a conductive line 701 is formed of a transparent electrode material, which is the same as that of the pixel electrode 304, and is connected to the common electrode 305 through a contact hole 702. Preferably, the conductive line 701 is connected to a conductive portion 305a of the common electrode 305 in order to improve conductivity. The contact hole 702 may be simultaneously formed in the step of removing a portion of the passivation layer 403 and exposing the drain electrode 405b, and the conductive line 701 may be formed simultaneously in the step of forming the pixel electrode 304.

Figure 8:
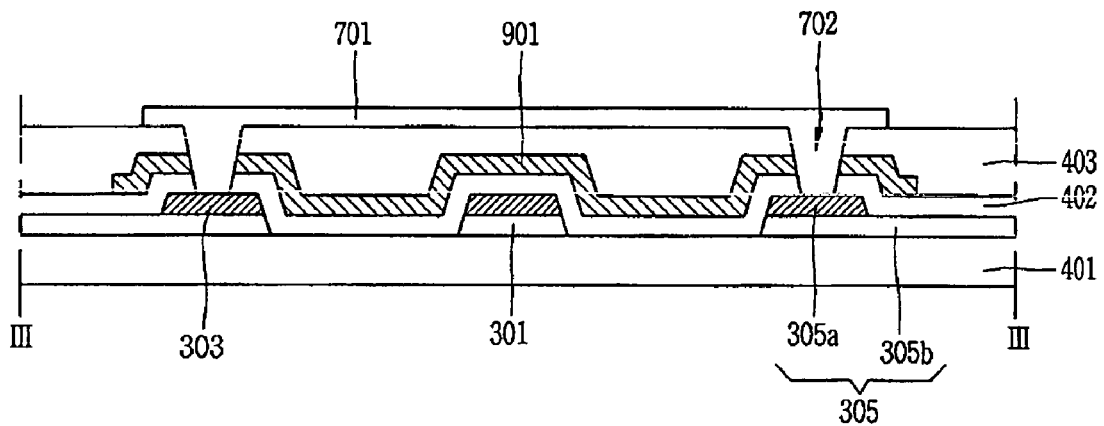
FIG. 8 is a sectional structure of a conductive path in accordance with a fourth exemplary embodiment of the present invention.

FIG. 8 illustrates another conductive path, which is a fourth exemplary embodiment of the present invention. FIG. 8 illustrates a plurality of conductive lines for further improving conductivity of the conductive path. As shown in FIG. 8, a conductive path includes a first conductive line 901 formed of the same conductive material as that of the source and drain electrodes 405a and 405b, and a second conductive line 701 formed of the same material as that of the pixel electrode 304. The first conductive line 901 is formed of the material used for the source and drain electrodes 405a and 405b, such as one selected from Mo, Mo alloy, Al, Al alloy, Ti, Ti alloy, Ta, Ta alloy, Co, Co alloy, Ni, Ni alloy and Cr. However, other materials can be used as appropriate. Because these materials have better conductivity compared to transparent electrode materials, such as ITO or the like, resistance of the conductive path connected between the common electrodes 305 can be lowered. Additionally, because the conductive path is formed at an edge of the common electrodes 305 as mentioned above, greenish discoloration of a display screen due to improper application of the common voltage may be reduced while minimizing cross talk problems generated between the data line 302 and the common electrode 305. In particular, a common electrode having uniform sectional profile is formed by using a diffraction mask to form the conductive path, thereby resolving cross talk problems.

FIGS. 9A to 9D illustrates an exemplary fabrication process according to the present invention with respect to the first exemplary embodiment of the present invention taken along view line I-I of FIG. 2. However, the fabrication may be applied with respect to the other exemplary embodiments without departing from the scope of the present invention.

Figure 9A:
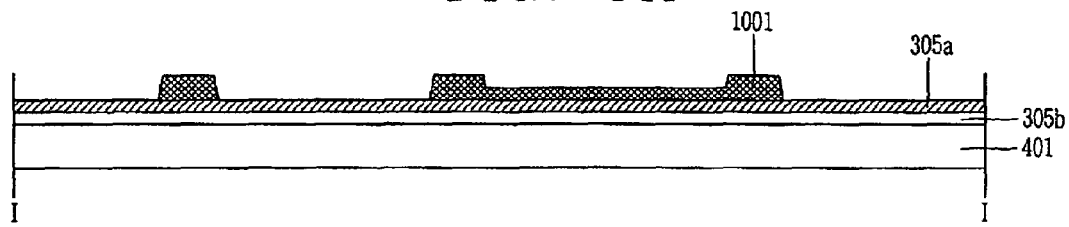
FIGS. 9A to 9D are views that sequentially illustrate a fabrication process in accordance with an exemplary embodiment of the present invention.

As shown in FIG. 9A, a transparent electrode material, such as ITO or TZO, is applied onto a substrate 401, such as glass, by a sputtering method, for example, to form a transparent electrode layer 305b. Then, a first conductive layer 305a is formed on the transparent electrode layer 305b. The first conductive layer 305a may be a metallic material or other materials having good conductivity and ohmic contact properties with the transparent electrode layer 305b.

Thereafter, photoresist is applied on the first conductive layer 305a and processed with diffractive exposure, thereby forming photoresist pattern 1001 having a step difference. The photoresist pattern 1001 defines a gate line (301), a common electrode (305), and a common electrode line (303). In the case of the second exemplary embodiment of the present invention (FIGS. 4 and 5), the photoresist pattern may further define a connection line (501).

Figure 9B:
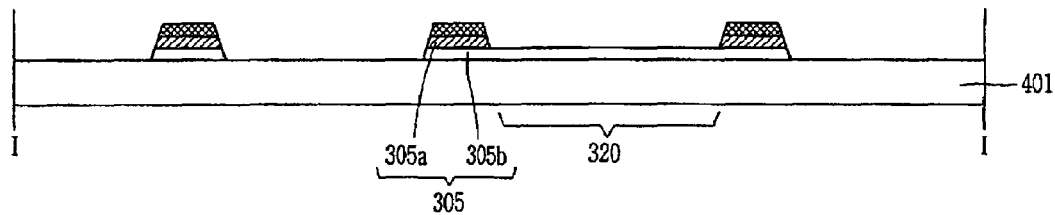

As shown in FIG. 9B, a first conductive layer 305a and a transparent electrode layer 305b are sequentially etched by using the photoresist pattern 1001 as an etching mask. As a result, a gate line 301, a common electrode 305, and a common electrode line 303 are formed. In particular, the photoresist pattern 1001 is ashed to define a light transmitting portion 320 of the common electrode 305. Namely, the photoresist pattern 1001 patterned by the diffractive exposure is relatively thin at the light transmitting region 320. This thin portion of the photoresist on the light transmitting portion 320 is removed by ashing, thereby exposing the first conductive layer 305a before the etching process. Then, the first conductive layer 305a of the light transmitting portion 320 is removed using the ashed photoresist pattern as an etching mask, to thereby complete the light transmitting portion 320.

Here, the gate line 301, the common electrode line 303, and a conductive portion 306 constituting an edge of the common electrode 305 are formed by stacking the transparent electrode layer 305b and the first conductive layer 305a, thereby improving electrical conductivity. Because the edges of the common electrode 305 are etched using a thick photoresist pattern 1001 by the diffractive exposure process, the common electrode 305 having an accurate shape are formed. Generally, when the edges of a common electrode are etched using the photoresist pattern formed using a half exposure process, the photoresist formed by the half exposure may result in uneven sectional profiles at the edges, resulting in the common electrode not being uniformly parallel to the data line 302. This results in generation of different parasitic capacitances along the unit pixel causing cross talk and greenish screen problems. However, by using diffractive expose on the photoresist to generate the photoresist pattern 1001, thick photoresist along the edges allow etching to be performed at least twice forming a common electrode having even and uniform edges. Once the common electrode 305 and gate line 301 are formed, the remaining photoresist is removed.

Figure 9C:
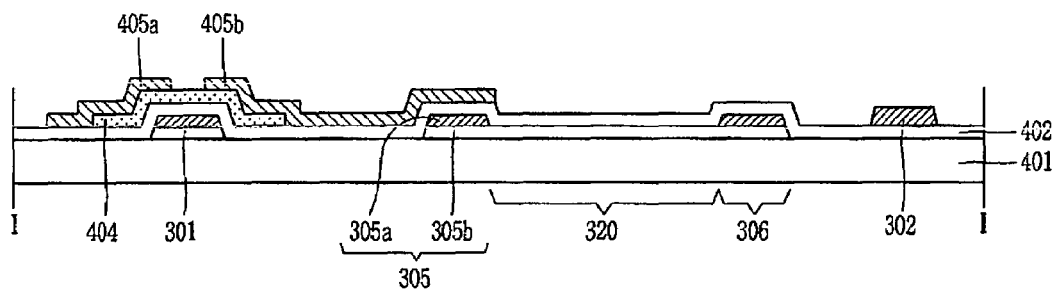

As shown in FIG. 9C, a gate insulation layer 402 is formed to cover the substrate where the gate line 301 and the common electrode 305 are formed. Then, an active layer 404 and source/drain electrodes 405a and 405b are formed, respectively. The process of forming the active layer 404 and the source/drain electrodes 405a and 405b includes forming a semiconductor layer on the gate insulation layer 402, forming an ohmic contact layer (not shown) on the semiconductor layer, forming a second conductive layer on the ohmic contact layer, and patterning the semiconductor layer and the second conductive layer to form the active layer 404 and the source/drain electrodes 405a and 405b. The active layer 404 and the source/drain electrodes 405a and 405b may be formed by diffraction exposure.

A data line 302 is formed in the step of forming the source and drain electrodes 405a and 405b. In the case of the third exemplary embodiment, the conductive line 901 may also be formed in the step of forming the source and drain electrodes 405a and 405b.

Figure 9D:
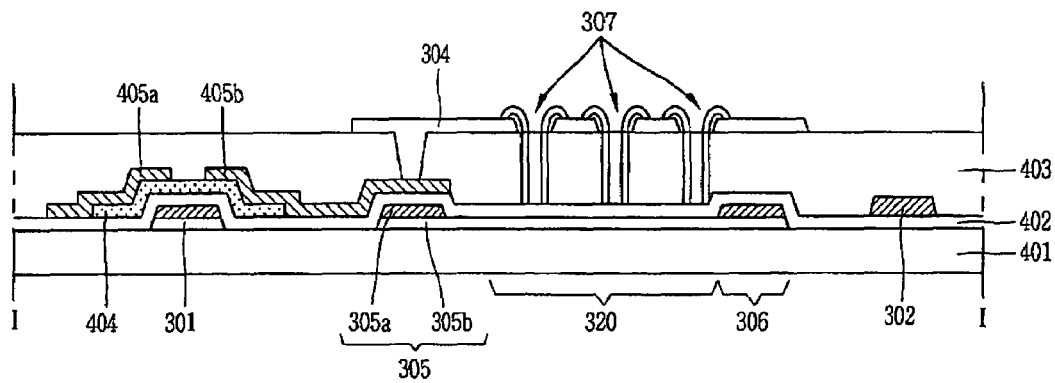

As shown in FIG. 9D, a passivation layer 403 is then formed to cover the source and drain electrodes 405a and 405b. After the formation of the passivation layer 403, a contact hole for exposing the drain electrode 405b is formed on the passivation layer 403. When the contact hole is formed, other contact holes, such as contact holes 702 that for the conductive path of the second and third exemplary embodiments, are formed at the same time.

Then, a transparent electrode material is applied on the passivation layer 403 including the contact hole, and pixel electrode 304 is formed by a photolithography process. The pixel electrode 304 includes slits 307 formed by removing the transparent electrode material. When voltage is applied to the pixel electrode 304, an in-plane electric field having a parabola shape is formed between the common electrode 305 and the pixel electrode 304 through the slits 307.

In the third exemplary embodiment, a contact line 701 connecting neighboring common electrodes 305 in the direction of the data line 302 is formed during the step of forming the pixel electrode 304. Through the aforementioned process, an exemplary LCD device in accordance with the present invention is completed.

As described above, the LCD device in accordance with the present invention includes a transparent common electrode and a pixel electrode to improve an aperture ratio. The pixel electrode further includes slits to form an in-plane electrode field having a parabola shape such that a viewing angle can be improved. In addition, electrical resistance of the common electrode is reduced by a conductive line formed along the edges of the common electrode, thereby smoothly transmitting a signal. By patterning the edge of the common electrode through a diffractive exposure process, formation of a profile of the common electrode is precisely controlled, thereby preventing cross talk and greenish screen problems. Further, a connection line and a conductive path to interconnect common electrodes together allow smooth transmission of a common voltage to the common electrodes.

As described heretofore, precise control of liquid crystal alignment is achieved by an in-plane electric field having a parabola shape. As a result, a viewing angle is improved. Also, by reducing resistance of the common electrode, the common voltage is smoothly applied, thereby improving image quality. Because the fabrication process of the present invention allows formation of precise profiles of the common electrode, signal interference between the data line and the pixel is reduced, thereby further improving image quality.

It will be apparent to those skilled in the art that various modifications and variations can be made in the LCD device of the present invention and the method of fabricating the same without departing form the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a unit pixel defined by a gate line formed on a substrate and a data line crossing the gate line;
a switching device formed in the unit pixel;
a common electrode line formed parallel to the gate line, the common electrode line including a first transparent electrode layer and a first conductive layer;
a common electrode having a conductive portion and a light transmitting portion formed within the unit pixel and connected to the common electrode line, the conductive portion formed along a periphery of the common electrode including a second transparent electrode layer and a second conductive layer, and the light transmitting portion including a third transparent electrode layer disposed in a middle portion of the common electrode includes a third transparent electrode layer;
a conductive path formed on the common electrode in a direction of the data line and electrically connecting the common electrodes of neighboring unit pixels, wherein the conductive path comprises a first conductive path formed of the same conductive material as a material of the data line and a second conductive path formed of the same material as that of the pixel electrode; and
a pixel electrode having a slit region arranged to face the common electrode.

2. The LCD device of claim 1, wherein the conductive portion is connected to the common electrode line.

3. The LCD device of claim 1, further comprising a connection line formed parallel to the gate line and electrically connecting the common electrodes.

4. The LCD device of claim 3, wherein the connection line is connected to the conductive portion.

5. The LCD device of claim 1, wherein the first, second, and third transparent electrode layers are formed from the same transparent electrode layer.

6. The LCD device of claim 1, wherein the first and second conductive layers are formed from the same conductive layer.

7. The LCD device of claim 1, wherein the gate line is formed of the first transparent electrode layer and the first conductive layer.

* * * * *